United States Patent
Bhat et al.

(10) Patent No.: US 11,543,992 B2
(45) Date of Patent: Jan. 3, 2023

(54) DECREASING PHYSICAL SECURE ERASE TIMES IN SOLID STATE DRIVES

(71) Applicant: Western Digital Technologies, Inc., San Jose, CA (US)

(72) Inventors: Vinayak Bhat, Bangalore (IN); Amiya Banerjee, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/185,325

(22) Filed: Feb. 25, 2021

(65) Prior Publication Data

US 2022/0179578 A1 Jun. 9, 2022

Related U.S. Application Data

(60) Provisional application No. 63/123,102, filed on Dec. 9, 2020.

(51) Int. Cl.
*G06F 3/06* (2006.01)

(52) U.S. Cl.
CPC .......... *G06F 3/0652* (2013.01); *G06F 3/0619* (2013.01); *G06F 3/0623* (2013.01); *G06F 3/0659* (2013.01); *G06F 3/0679* (2013.01)

(58) Field of Classification Search
CPC ...... G06F 3/0652; G06F 3/0619; G06F 3/062; G06F 3/0659; G06F 3/0679
See application file for complete search history.

(56) References Cited

U.S. PATENT DOCUMENTS

| 8,705,291 B2 | 4/2014 | Goss et al. |
| 9,368,218 B2 | 6/2016 | Ziperovich |
| 9,390,001 B2 | 7/2016 | Oh et al. |
| 10,522,229 B2 | 12/2019 | Luo et al. |
| 2008/0140909 A1* | 6/2008 | Flynn .................. H05K 7/1444 711/100 |

(Continued)

OTHER PUBLICATIONS

S. Li, W. Tong, J. Liu, B. Wu and Y. Feng, "Accelerating garbage collection for 3D MLC flash memory with SLC blocks," 2019 IEEE/ACM International Conference on Computer-Aided Design (ICCAD), 2019, pp. 1-8, doi: 10.1109/ICCAD45719.2019. 8942097. (Year: 2019).*

(Continued)

*Primary Examiner* — Kalpit Parikh
(74) *Attorney, Agent, or Firm* — Ravi Mohan; Rutan & Tucker, LLP

(57) ABSTRACT

Storage devices may be configured to desirably reduce the time required to perform a physical secure erase operation. The storage device includes a controller that is configured to direct the storage device to receive a physical secure erase command. The storage device can then identify the one or more blocks within the memory array for secure erasure based on the received physical secure erase command. For each block identified for erasure, the storage device further evaluates the block to determine the level type of cells within the block. In response to the cell level type being single-level, a single-cell erase command is issued to perform a single-level cell erase on the block. Conversely, in response to the cell level type being a higher-dimensional cell, a modified single-cell erase command to perform a modified single-level cell erase on the block is issued.

20 Claims, 6 Drawing Sheets

(56) References Cited

U.S. PATENT DOCUMENTS

| | | | |
|---|---|---|---|
| 2009/0006929 A1* | 1/2009 | Gorobets | G11C 16/344 |
| | | | 714/763 |
| 2012/0127807 A1* | 5/2012 | Pio | G11C 7/109 |
| | | | 365/189.09 |
| 2015/0293809 A1* | 10/2015 | Liang | G06F 11/076 |
| | | | 714/704 |
| 2017/0364282 A1* | 12/2017 | Margalit | G06F 3/064 |
| 2018/0143877 A1* | 5/2018 | Yang | G11C 16/26 |

OTHER PUBLICATIONS

Chang, H. et al., "How to Enable Software Isolation and Boost System Performance with Sub-block Erase over 3D Flash Memory", In Proceedings of the 11th IEE/ACM/IFIP International Conference on Hardware/Spftware Codesign and System Synthesis, Oct. 1, 2016, pp. 1-10.

Chen, T. et al., "Enabling Sub-blocks Erase Management to Boost the Performance of 3D NAND Flash Memory". In Proceedings of the 53rd Annual Design Automation Conference, Jun. 5, 2016, pp. 1-6.

Wei, M. et al., "Reliably Erasing Data From Flash-Based Solid State Drives", in FAST, vol. 11, 2011, p. 8.

\* cited by examiner

DECREASING PHYSICAL SECURE ERASE TIMES IN SOLID STATE DRIVES

PRIORITY

This application claims the benefit and priority to U.S. Provisional Application No. 63/123,102, filed Dec. 9, 2020, which is incorporated in its entirety herein.

FIELD

This disclosure relates to data management on solid state drives. More particularly, the present disclosure technically relates to increasing performance during physical secure erase procedures.

BACKGROUND

Data is often routinely written to and erased from storage devices within computing systems. However, there are many instances where a more thorough method of erasing data is desired in order to prevent any attempted recovery of the erased data. To accommodate these needs, storage devices such as solid state drives (SSDs), may be configured to receive a physical secure erase (PSE) command from a host computing system. Once received, the SSD can perform operations that render the erased data within the memory devices unreadable.

Often, a PSE command will be processed by performing an erase operation followed by a flash write operation to the affected blocks. However, as SSD sizes have increased and grown in complexity, the time needed to perform a PSE also increases. For example, a PSE command on a quad-level cell (QLC) takes more time to complete than a single-level cell (SLC). Additionally, as SSD sizes grow, larger amounts of data-storing blocks may be issued PSE commands, further extending the time needed to complete the operation. These increased time demands can compete against other demands such as requirements of host computing systems and/or vendors that have an expectation that a PSE command will be completed within a specified amount of time.

BRIEF DESCRIPTION OF DRAWINGS

The foregoing summary is illustrative and is not intended to be in any way limiting. In addition to the illustrative aspects, embodiments, and features described above, further aspects, embodiments, and features will become apparent by reference to the following drawings and the detailed description.

Figure 1:
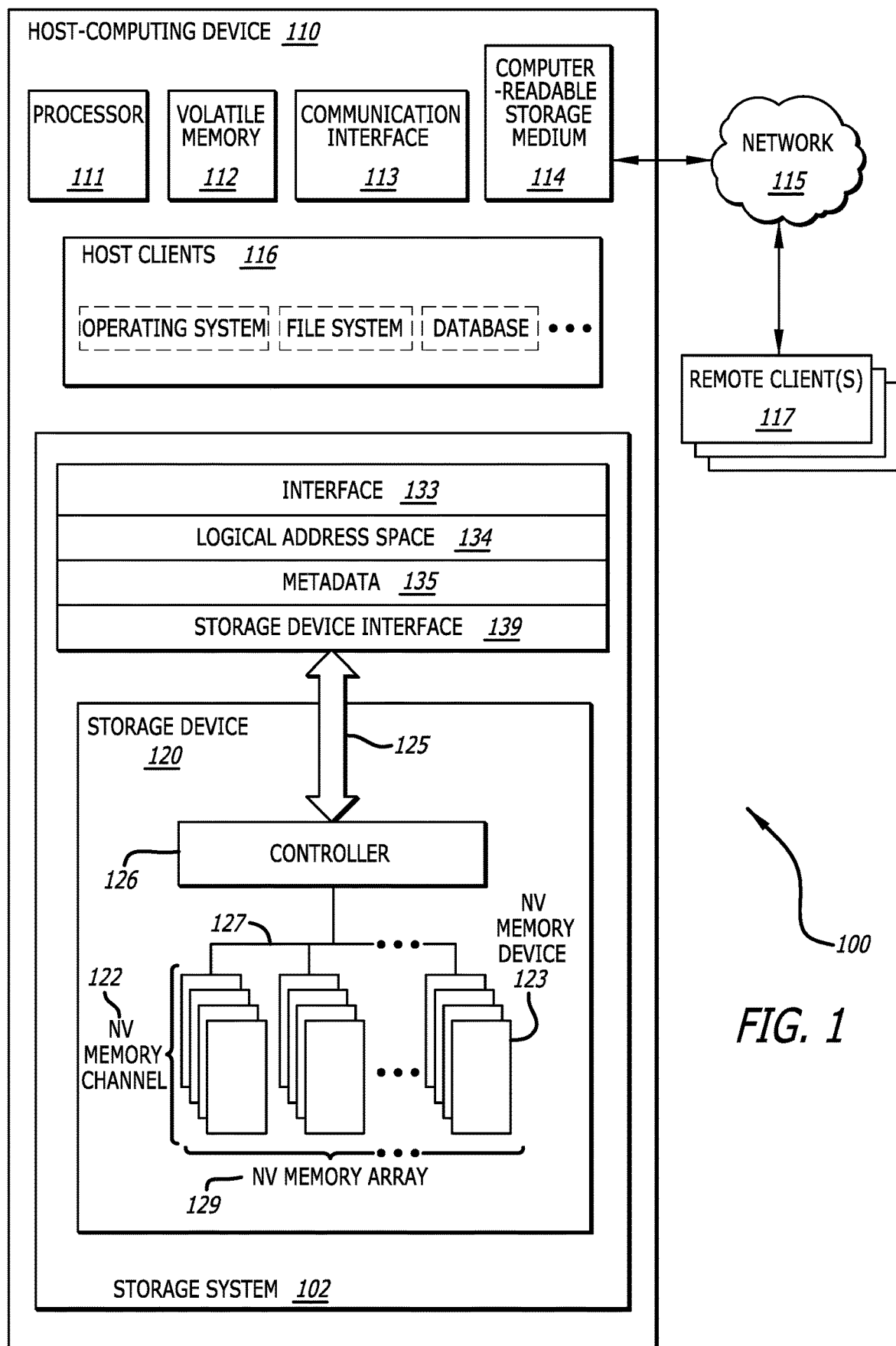
FIG. 1 is a schematic block diagram of a host-computing device with a storage device suitable for faster physical secure erasures in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are discussed herein that describe processes for performing physical secure erase operations with reduced times. Host-computing systems are increasingly demanding PSEs to be completed within shorter amounts of time. Conversely, storage device memory array sizes are continually increasing due to an increased number of blocks. The increased number of blocks requires additional time to complete the PSE. Thus, there is a need to reduce the overall times required to complete a PSE on storage devices.

In many embodiments described herein, a modified PSE process takes advantage of differences in how varying levels of memory cells are erased. For example, the time needed to erase a single-level memory cell is typically shorter than the time required to properly erase a higher-level memory cell. Various embodiments can identify the level type of each block that is scheduled for a PSE and apply differing erase operations based on that identified cell level. However, instead of applying a higher-level PSE operation to the higher-level memory cells, a number of embodiments can simply apply a single-level cell PSE operation. By changing one or more parameters of the single-level cell PSE operation, satisfactory erasure results may occur on higher-level cells. As described in more detail below, the parameters that can be modified include, but are not limited to, the strength of the pulses applied to the memory cell and the amount of time the pulses are applied.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for improved PSEs in accordance with an embodiment of the invention is shown. The improved PSE system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise a computer-readable storage medium 114. The computer-readable storage medium 114 may comprise executable instructions configured to cause the host-computing device 110 (e.g., via processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117. The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile storage medium, or the like. Further, the storage device 120, in various embodiments, may comprise a non-volatile recording device, a non-volatile memory array, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
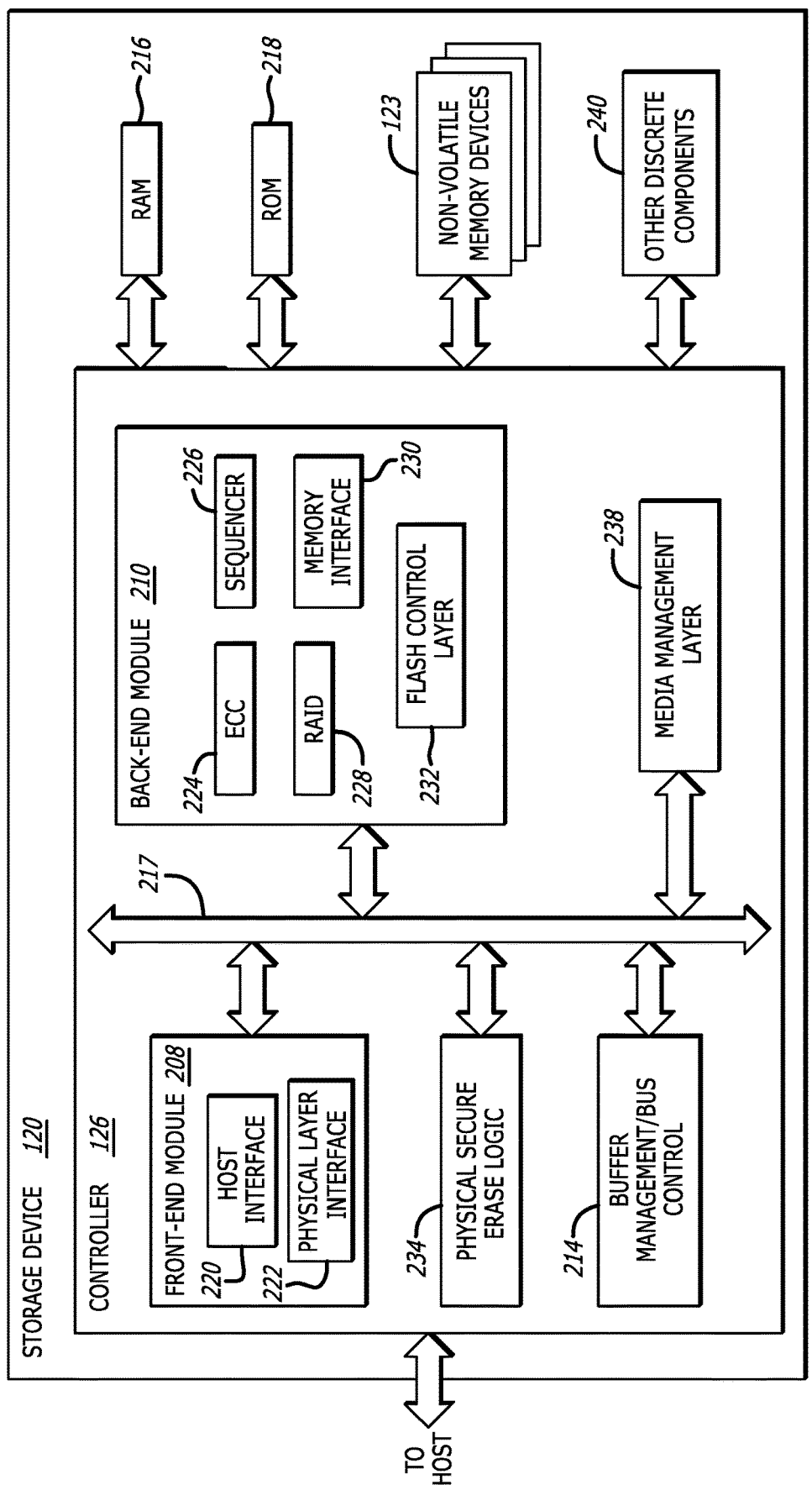
FIG. 2 is a schematic block diagram of a storage device suitable for faster physical secure erasures in accordance with an embodiment of the invention.

FIG. 2 is a block diagram illustrating exemplary components of the storage device 120 in more detail. The controller 126 may include a front-end module 208 that interfaces with a host, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/ bus control module 214 are optional components that may not be necessary in the controller 126.

Finally, the controller 126 may also comprise a physical secure erase logic 234 that can be configured to carry out a modified physical secure erase command for the storage device 120. As described in more detail below, the physical secure erase logic 234 can be configured to receive commands to perform a PSE operation which can be modified via a plurality of factors such as time and pulse strength. These modifications can be utilized to perform a PSE in a shorter overall amount of time.

Figure 3:
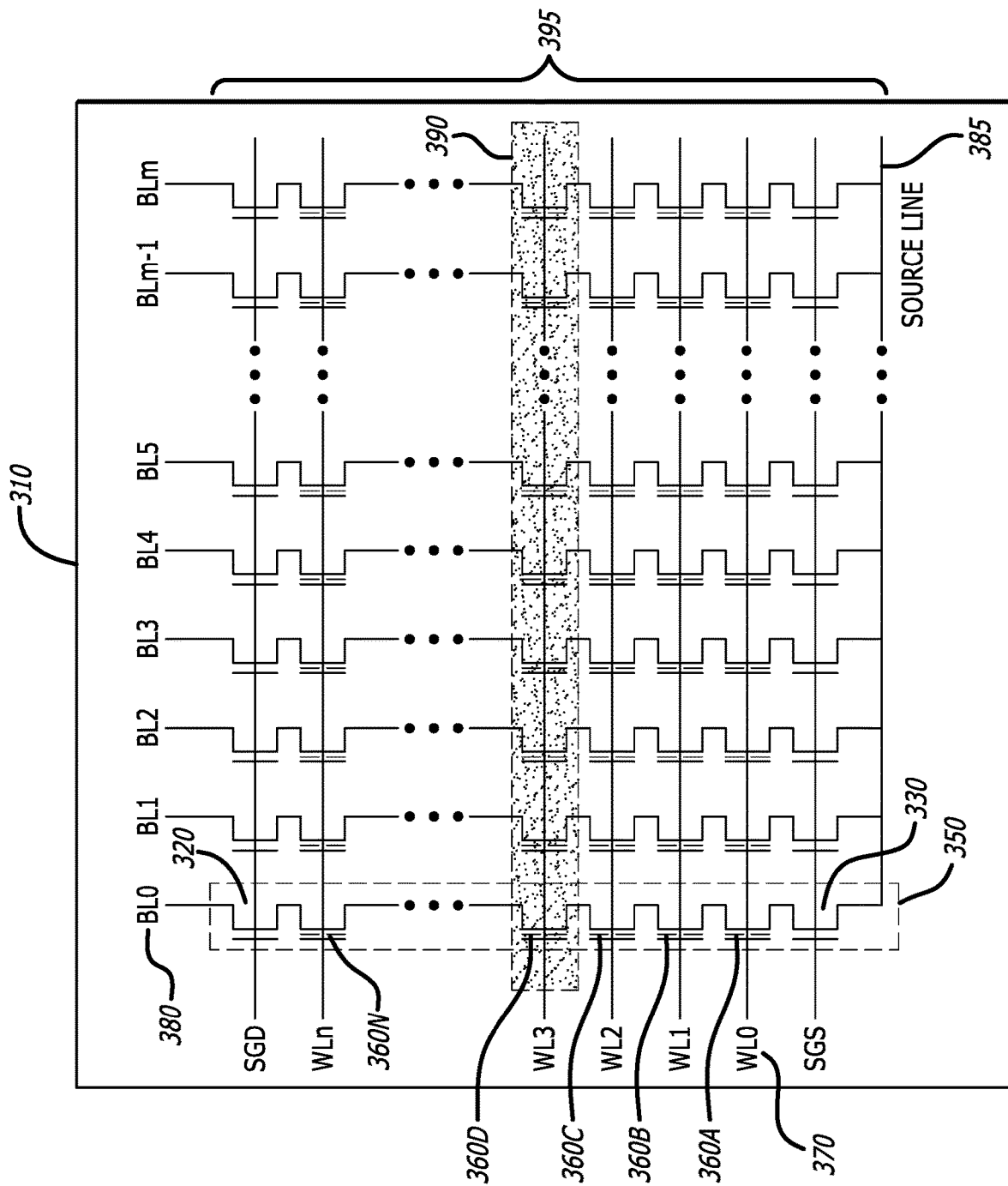
FIG. 3 is a conceptual schematic diagram of a two-dimensional memory array in accordance with an embodiment of the invention.

Referring to FIG. 3, a conceptual schematic diagram of a two-dimensional memory array 310 in accordance with an embodiment of the invention is shown. Memory cells, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations.

Figure 4:
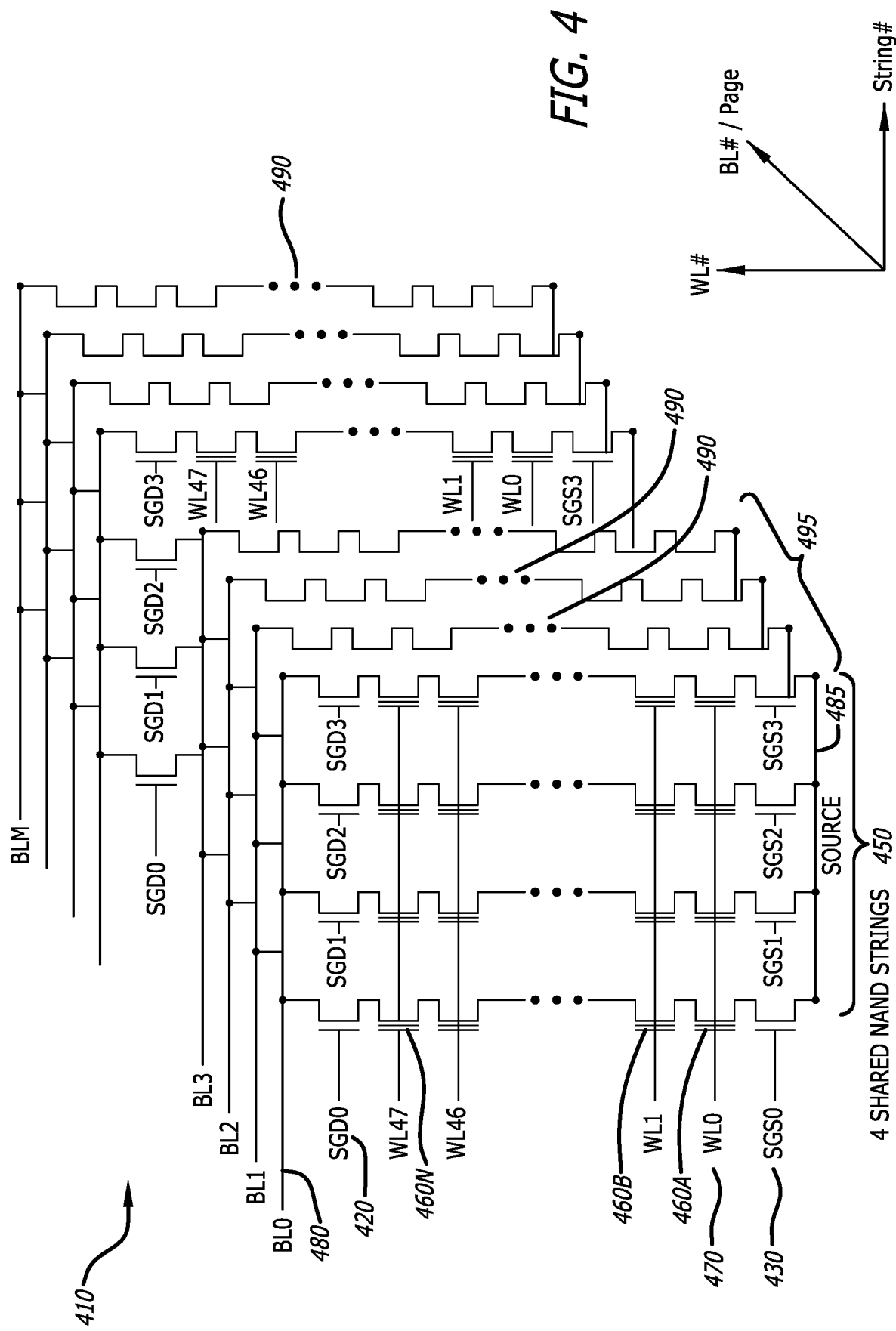
FIG. 4 is a conceptual schematic diagram of a three-dimensional memory array in accordance with an embodiment of the invention.

Referring to FIG. 4, a conceptual schematic diagram of a three-dimensional memory array 410 in accordance with an embodiment of the invention is shown. More specifically, FIG. 4 is a schematic diagram of one example of a three-dimensional memory array 410, such as a 3D or vertical NAND memory array or a BiCS2 cell array. In many embodiments, a three-dimensional memory array 410 can made up of a plurality of pages 490. Each page 490 may include a set of NAND strings 450 (four NAND strings are shown). Each set of NAND strings 450 is typically connected in common to a bit line 480. Each NAND string 450 may also include a select gate drain transistor (SGD) 420, a plurality of memory cells 460A, 460B, 460N, and a select gate source transistor (SGS) 430. A row of memory cells is connected in common to a word line 470.

The memory cells 360, 460 shown in the embodiments depicted in FIGS. 3 and 4 are made up of a transistor that has a charge storage element to store a given amount of charge representing a memory state. The memory cells may be operated in a single-level cell (SLC) storing 1 bit of memory per cell, a MLC or X2 cell storing 2 bits of memory per cell, a tri-level cell (TLC) storing 3 bits of memory per cell, a quad-level cell (QLC) storing 4 bits of memory per cell, or any types of memory cell storing any number of bits per cell. The SGDs 320, 420 and SGSs 330, 430 are depicted as transistors where the voltage levels are also programmed to a certain threshold voltage level. SGDs 320, 420 connect or isolate the drain terminals of the NAND strings 350, 450 to the bit lines 380, 480. SGSs 330, 430 can connect or isolate the source terminals of the NAND strings 350, 450 to source lines 385, 485. The SGDs and SGSs can be configured to condition the word lines 370, 470 for read, program, and erase operations.

To read the data correctly from memory cells 360, 460 in a NAND configuration, the following requirements must be all met: (1) threshold voltage distributions in word lines are in proper states; (2) threshold voltage distributions in SGDs are in proper levels; and (3) threshold voltage distributions in SGSs are in proper levels. Without any one of these requirements, the data is unreadable. Page 390, 490 of FIG. 3 and FIG. 4 respectively, is a group of memory cells that are programmed as a group. Multiple pages 390, 490 can make up a block 395, 495. The memory cells in an individual block 395, 495 are typically erased together. A page is often the smallest write unit, and a block is often the smallest erasure unit.

This disclosure is not limited to the two dimensional and three-dimensional memory arrays as described in FIG. 3 and FIG. 4 but can cover all relevant memory structures as understood by one skilled in the art. Other three-dimensional arrays are possible, such as a NAND string formed in a U-shape. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of a solid state drive.

Hosts, such as the host-computing device 110 of FIG. 1, may issue a PSE command to the storage device 120 to physically wipe out any storage data on the solid state drive so that any stored data cannot be read out by any currently known method.

Figure 5:
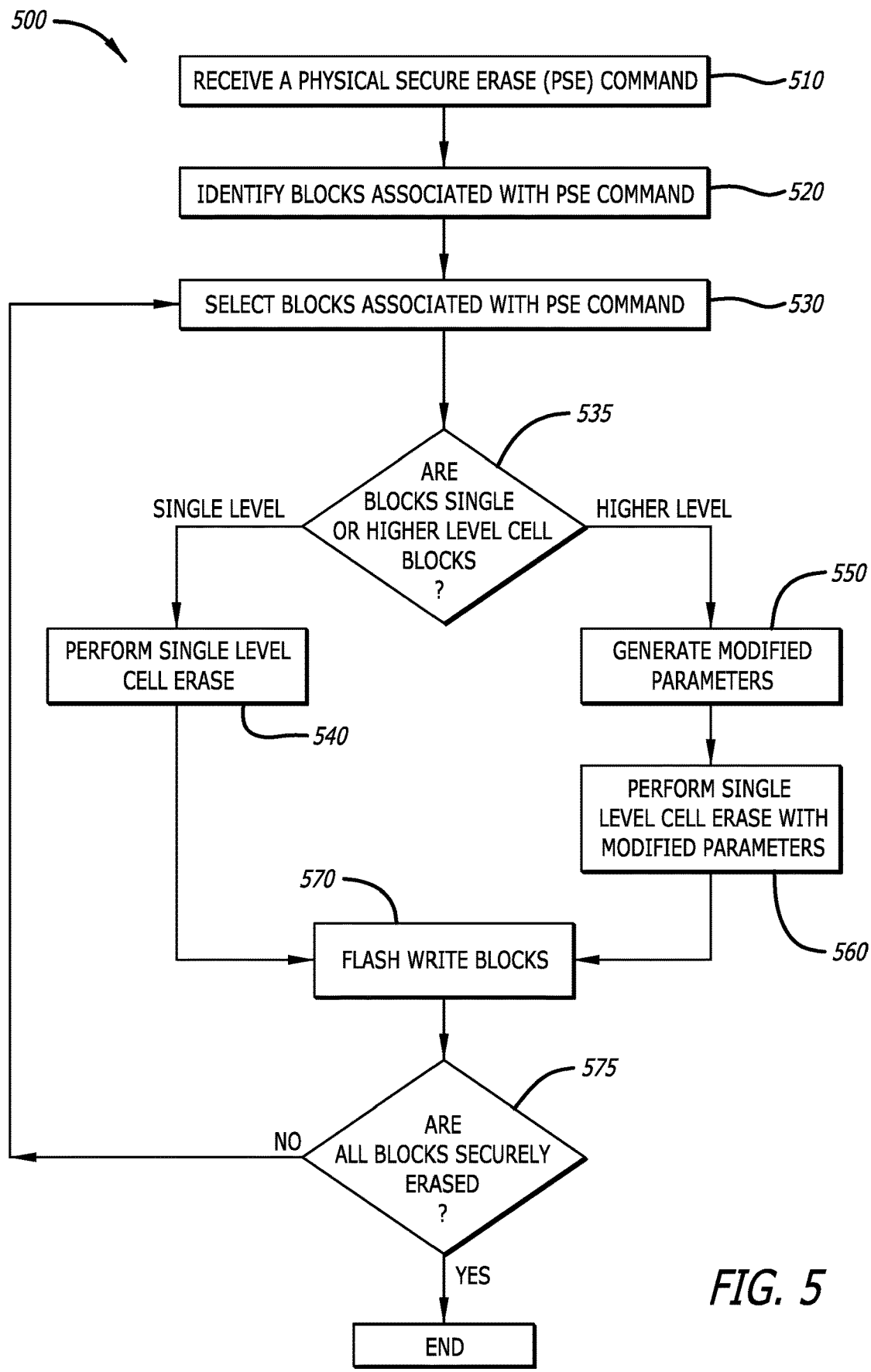
FIG. 5 is a flowchart depicting a process for performing an improved physical secure erase in accordance with an embodiment of the invention.

Referring to FIG. 5, a flowchart depicting a process 500 for performing an improved physical secure erase in accordance with an embodiment of the invention is shown. In many embodiments, the process 500 commences when a PSE command is received (block 510). The storage device (processed via the storage device firmware) can receive a PSE command from one of its various inputs. Often, the PSE command will be received from a host-computing device. In additional embodiments, the PSE command will comprise or accompany one or more parameters or requests that the PSE be completed within a predetermined amount of time. In particular embodiments, the time requirement given by a host-computing system is thirty seconds or less.

Once a PSE command has been received, the storage device can begin to parse the PSE command to identify which blocks are to be erased (block 520). In some embodiments, the PSE command can apply to all blocks within the storage device. However, any number of blocks may be selected for erasure via a PSE. In some embodiments, the identification of blocks set for erasure can first be evaluated to determine if the block is already in a securely erased state. When it is determined that a block is already in a state similar to being securely erased, the firmware may remove that block from the erasure operation, thus further reducing the amount of time needed to complete the PSE command. When the blocks for erasure have been identified, the storage device can select a first group of blocks for erasure (block 530). The PSE operations can be done on any number of blocks at a time, including groups of blocks that are operated on simultaneously.

The process 500 can begin the PSE operations by evaluating the selected blocks to determine if each block is either a single-level cell or a higher-level cell (blocks 535). As those skilled in the art will recognize, the higher-level cells can include a multiple-level cell, a tri-level cell, a quad-level cell, among others of higher-levels that may be compatible. In response to a block being determined to be a single-level cell, the process 500 can perform a typical single level cell erase on the block (block 540).

However, when a block is determined to be a higher-level cell, the process 500 can begin a modified PSE. The modified PSE can begin by generating one or more modified parameters which can be utilized within a single-level cell erase command (block 550). Any number of parameters may be changed. However, in a number of embodiments, the strength of the pulses applied to the memory cells during the erasure process is changed via a modified parameter. Similarly, the length of time corresponding to the application of the pulses can also be modified via parameter. Often, there is a relationship between the length of time of the erase pulses applied and the level of erasure of the memory cell.

Once the modified parameters have been generated, the process 500 can then perform a modified single level cell PSE on the higher-level cells utilizing those modified parameters (block 560). In many embodiments, the modified PSE utilizes stronger pulses applied to the memory cells during the erasure. In further embodiments, the modified PSE may apply erasure pulses for a longer period of time compared to a typical, non-modified single-level cell PSE. Often, the time of the modified PSE operation is longer than a non-modified PSE while also being shorter in time compared to a non-modified higher-level PSE.

Whether the blocks being erased under the PSE have been determined to be either single-level cell and/or higher-level cells, the process 500 can then flash write data to each of the blocks (block 570). This is often done after a block erasure in order to increase the useful lifetime of the memory cells within the block. In certain embodiments, the flash write is also done to further obscure any residual data within the storage device blocks.

Once the blocks under operation have been processed, the storage device can determine if any further blocks remain to be processed via the PSE (block 575). When all blocks have been processed and securely erased, the process 500 can end. If further blocks are awaiting processing for PSE, the process can subsequently select new blocks associated with the PSE command (block 530).

Figure 6:
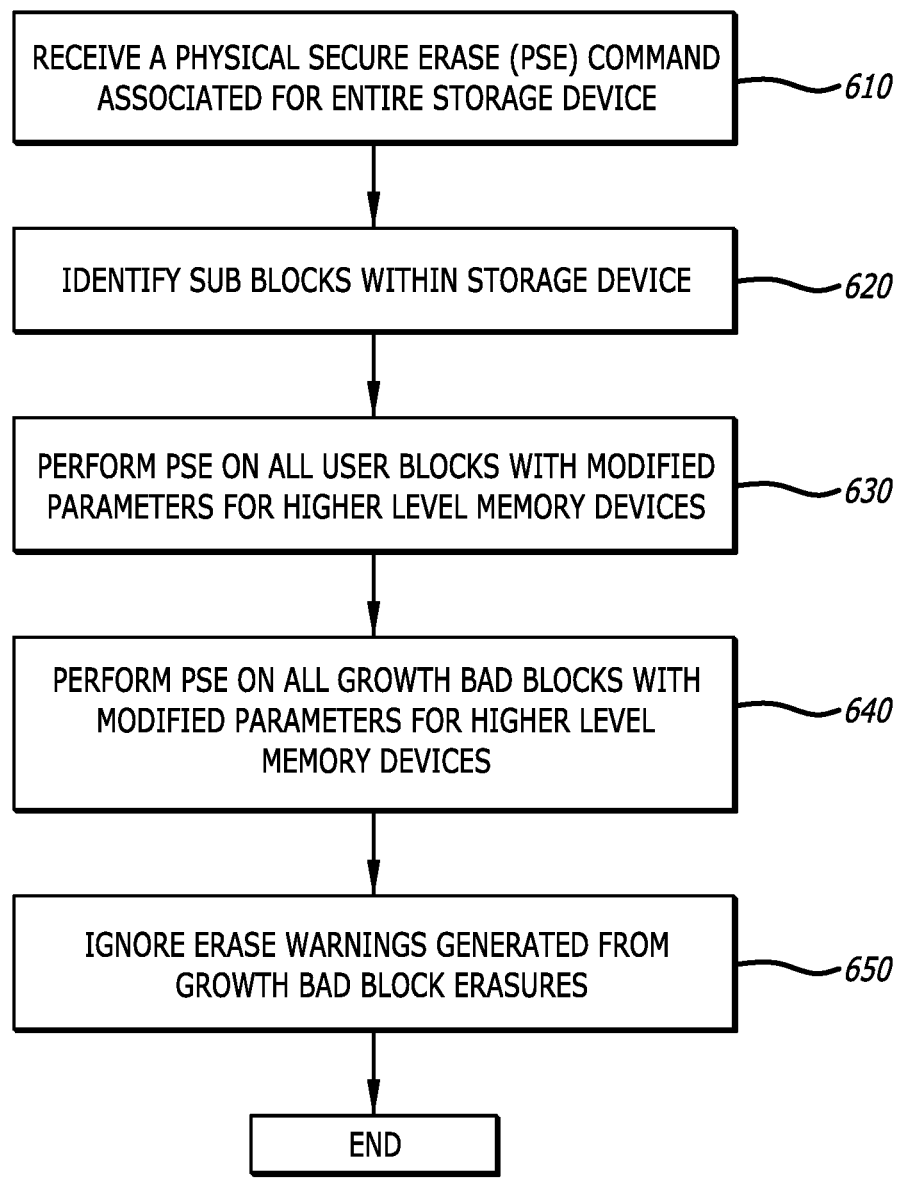
FIG. 6 is a flowchart depicting a process for performing an improved physical secure erase on a storage device with one or more sub blocks in accordance with an embodiment of the invention.

Referring to FIG. 6, a flowchart depicting a process 600 for performing an improved physical secure erase on a storage device with one or more sub blocks in accordance with an embodiment of the invention is shown. In various embodiments, the storage device utilized within a host-computing device contains one or more sub blocks. In some instances, the storage device may receive a PSE command that affects blocks across multiple sub blocks. This can happen when a PSE command is received to securely erase the entire storage device. The process 600 depicts such a command but can apply similarly to PSE commands that affect multiple sub blocks without erasing the entire storage device. Traditional methods of processing PSE commands over multiple sub blocks treat each sub block as a separate drive. However, executing a PSE over each sub block creates additional overhead such that erasing multiple sub blocks on a storage device takes longer than applying a single PSE over the entire storage device. In certain embodiments, applying a PSE command over an entire storage device may save between ten and fifteen percent of the total time needed to apply a PSE on each sub block.

Process 600 can begin when a storage device receives a PSE command associated with all of the blocks within the memory array (block 610). The storage device (i.e. the firmware parsing and processing the PSE command) can identify all of the sub blocks within the storage device affected by the PSE command (block 620). The identification can determine if the blocks within the sub block comprise either single- or higher-level cells similar to the process described in FIG. 5 above. Upon identification, the process 500 can perform the PSE on all higher-level cell user blocks with modified parameters (block 630). It is assumed (and not shown) that single-level cells within the user blocks are also processed with a PSE using a non-modified PSE operation.

In a number of embodiments, the storage device will have a memory array that has blocks that are classified as "user blocks" that are blocks of memory cells that are available to the user for data storage. During the normal course of operation, blocks may become damaged or otherwise unusable. These blocks are separated from user blocks into a "growth bad blocks" section. However, due to the fact that one bad cell within a block may render the entire block bad, a possibility exists that data within one or more of the growth bad blocks may be readable if not erased. Therefore, various embodiments of the process 600 perform a PSE on all higher-level growth bad blocks with modified parameters (block 640). Typically, when a growth bad block is erased, the system will generate one or more error messages that may affect further processing. However, the process 600 can ignore any errors generated from erasing the growth bad blocks (block 650).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
   a controller configured to direct the storage device to:
      receive a physical secure erase command; and
      identify one or more blocks for erasure based on the received physical secure erase command;
      wherein, for each block identified for erasure, the storage device;
         evaluates the block to determine a level type of cells within the block;
         in response to a cell level type being single-level, issues a single-cell erase command to perform a single-level cell erase on the block; and
         in response to the cell level type being a higher-dimensional cell, issues a single-cell erase command to perform a single-level cell erase on the block,
         wherein the single-cell erase command is modified prior to erasure, and wherein the storage device discards the block from erasure in response to a determination that a block is already in a securely erased state.

2. The storage device of claim 1, wherein the modified single-level cell erase command is modified via changing one or more parameters.

3. The storage device of claim 2, wherein the one or more parameters include adjusting the application time of the single-level cell erase.

4. The storage device of claim 3, wherein the application time of the modified single-level cell erase is longer than the non-modified single-level erase.

5. The storage device of claim 4, wherein the application time of the modified single-level cell erase is longer than the non-modified single-level erase and shorter than a quad-level cell erase.

6. The storage device of claim 2, wherein the one or more parameters include adjusting the pulse strength of the single-level cell erase.

7. The storage device of claim 3, wherein the pulse strength of the modified single-level cell erase is stronger than the non-modified single-level erase.

8. The storage device of claim 1, wherein the controller further directs the storage device to flash write each block upon completion of the physical secure erase.

9. The storage device of claim 1, wherein the physical secure erase is completed within a predetermined amount of time.

10. The storage device of claim 9, wherein the predetermined amount of time to complete a physical secure erase of all blocks within the storage device is less than thirty seconds.

11. The storage device of claim 1, wherein the physical secure erase command is received from a host computing device.

12. The storage device of claim 11, wherein the received physical secure erase is completed within a time determined by the host computing system.

13. The storage device of claim 1, wherein the evaluation of the blocks to determine the level type of cells within the block is accomplished via a data trace.

14. The storage device of claim 1, wherein the level-type of the higher-dimensional cells are triple-level cells.

15. The storage device of claim 1, wherein the level-type of the higher-dimensional cells are quad-level cells.

16. A method of performing a physical secure erase on a storage device, the method comprising:
   receiving a physical secure erase command; and
   identifying one or more blocks for erasure based on the received physical secure erase command;
   wherein, for each block identified for erasure, the storage device:
      evaluates the block to determine a level type of cells within the block;
      in response to the cell level type being single-level, issues a single-cell erase command to perform a single-level cell erase on the block; and
      in response to the cell level type being a higher-dimensional cell, issues a single-cell erase command to perform a single-level cell erase on the block,
      wherein the single-cell erase command is modified prior to erasure, and wherein the storage device discards the block from erasure in response to a determination that a block is already in a securely erased state.

17. The method of claim 16, wherein the storage device comprises one or more sub blocks.

18. The method of claim 17, wherein the evaluation and erase of blocks is done first on user blocks and then growth bad blocks.

19. The method of claim 18, wherein error messages generated from erasing growth bad blocks are ignored.

20. A storage device, comprising:
   a controller configured to direct the storage device to:
   receive a physical secure erase command; and
   identify one or more blocks for erasure based on the received physical secure erase command;
   wherein, for each block identified for erasure, the storage device;

evaluates the block to determine:
   a level type with respect to cells within the block; and
   whether the block is already in a securely erased state;
in response to the cell level type being single-level and not in a securely erased state, issues a single-cell erase command to perform a single-level cell erase on the block; and
in response to the cell level type being a higher-dimensional cell and not in a securely erased state, issues a single-cell erase command to perform a single-level cell erase on the block,
wherein the single-cell erase command is modified prior to erasure, and wherein the storage device discards the block from erasure in response to a determination that a block is already in a securely erased state.

\* \* \* \* \*